United States Patent [19]

Baker

[11] 4,070,549

[45] Jan. 24, 1978

[54] REMOTE LOCATION ELECTRONIC ACTUATOR AND SYSTEM THAT INCLUDES THE SAME

[75] Inventor: Richard H. Baker, Bedford, Mass.

[73] Assignee: David Otten, Newton, Mass. ; a part interest

[21] Appl. No.: 714,702

[22] Filed: Aug. 16, 1976

[51] Int. Cl.² ........................................... H04M 11/00
[52] U.S. Cl. ................................ 179/2 A; 179/2.5 R; 340/310 R
[58] Field of Search ..................... 179/2 R, 2 A, 84 R; 340/310 R, 310 A, 151, 163; 179/2.5 R

[56] References Cited

U.S. PATENT DOCUMENTS

| | | | |
|---|---|---|---|
| 3,521,267 | 7/1970 | Lester | 179/2.5 R |
| 3,702,904 | 11/1972 | Bard | 179/84 R |
| 3,783,193 | 1/1974 | Lee | 179/2 A |
| 3,876,836 | 4/1975 | Langan | 179/84 R |
| 3,909,618 | 9/1975 | Fujii | 179/2.5 R |
| 3,949,172 | 4/1976 | Brown | 179/2.5 R |

Primary Examiner—Kathleen H. Claffy
Assistant Examiner—Joseph A. Popek

[57] ABSTRACT

A remote location actuator that is adapted to receive an input signal, to ascertain whether or not the input signal contains a message upon which the actuator should act, and to effect some predetermined act upon receipt of an appropriate message. By way of illustration, the signal may be in the form of, say, two trains of pulses that may be produced by a telephone bell, the message being contained in the number of pulses in each train. Input to the actuator may be in the form of electromagnetic transfer from the telephone.

36 Claims, 6 Drawing Figures

REMOTE LOCATION ELECTRONIC ACTUATOR AND SYSTEM THAT INCLUDES THE SAME

The present invention relates to electronic actuators that can be activated from afar.

There exists a need for apparatus to permit an operator at a first location to effect some control over an operation at a second location that may be quite remote and ordinarily inaccessible from the first location. For example, the electric utilities need the capability of removing electric loads from their network at strategic times such as at peak load hours; thus, a great capital savings could be realized by the possibility of removing home electric water heaters from the utility network at selected hours of the day or even at selected hours of particular days when system peaks are imminent. Timers and the like that have been used have not proved very successful and such timers do not permit removal of loads to meet randomtype peak load situations such as might occur during a summer heat wave.

Accordingly, it is an object of the present invention to provide an actuator (also referred to as a remotely activated command and control device herein) that can be placed at a location and that can be activated by a signal prompted by action at some other location.

While the actuator may be used in associated with other than telephone systems, it is described in association with a telephone system, another object of the invention being to provide an actuator or remotely activated command and control device whereby an electric utility, for example, using the existing telephone system, can remove from and then return electric loads to its power lines at strategic times.

These and still further objects are addressed hereinafter.

The foregoing objects are achieved in a remotely activated command and control device that comprises, in combination, transducer means operable to pickup as input thereto, across a local link, a wireless input signal, initiated over a distant link, in the form of a predetermined code and to convert the same to an internal signal; means for decoding connected to accept the internal signal from the transducer means and to provide an activating signal that is directly related to the code on the input signal, said means for decoding comprising analog means and digital logic means; and switch means that receives the activating signal and is selectively activated thereby. The device may be used in association with a telephone system that includes a sending telephone and a receiving telephone, the distant link being the connecting link between the sending telephone and the receiving telephone and the local link being the connecting link between the receiving telephone and said device. The distant link provides communication between two usually widely separated points; the local link provides communication between two points in close proximity to one another.

The invention is hereinafter described with reference to the accompanying drawing in which.

Before going into a detailed discussion of the invention, some brief remarks are in order. Although the electronic actuator herein disclosed has application in connection with systems other than telephone systems, it is, as previously noted, particularly useful in the context of such systems and is described in that context. In that context, the actuator of the present invention may be used, by way of illustration, and as above indicated, by an electric utility company to bring onto the power system of the company selected loads or to remove the loads from the system at predetermined times or at selected times to meet particular exigencies; or the actuator may be used within an industrial complex to place large electric loads such as air compressors and the like selectively on the electric power system; or the actuator may be used by a householder to change the thermostat setting of the home-heating system to permit a residence to drop in temperature during the day when no one is home but to permit the temperature to be raised prior to the resident returning home. In any event, the preferred form of communication between an operator and the electronic actuator is a telephone system; the message to the actuator may be in the form of a plurality of telephone calls, each of which may contain the same number or a different number of rings. As an example, input to the actuator may be two calls or pulse trains: thus, a two-three code may be used wherein a call consisting of two pulses or rings followed within a predetermined short time by a second call consisting of three pulses or rings will, say, activate an air compressor or the like, whereas a three pulse call followed by a two pulse call may be employed to deactivate the compressor or the like. Communication between the receiving telephone and the actuator may be acoustical, that is, through the air or, even, vibrationally through the base of the telephone, but the preferred form is by sensing the electromagnetic signals that emanate from a ringing telephone bell, the latter being much less susceptible to ambient noise than the former. Use of electromagnetic signals reduces the possibility of triggering by ambient noise and permits, as well, actuation at a subliminal level below the audible sound threshold.

Figure 1:
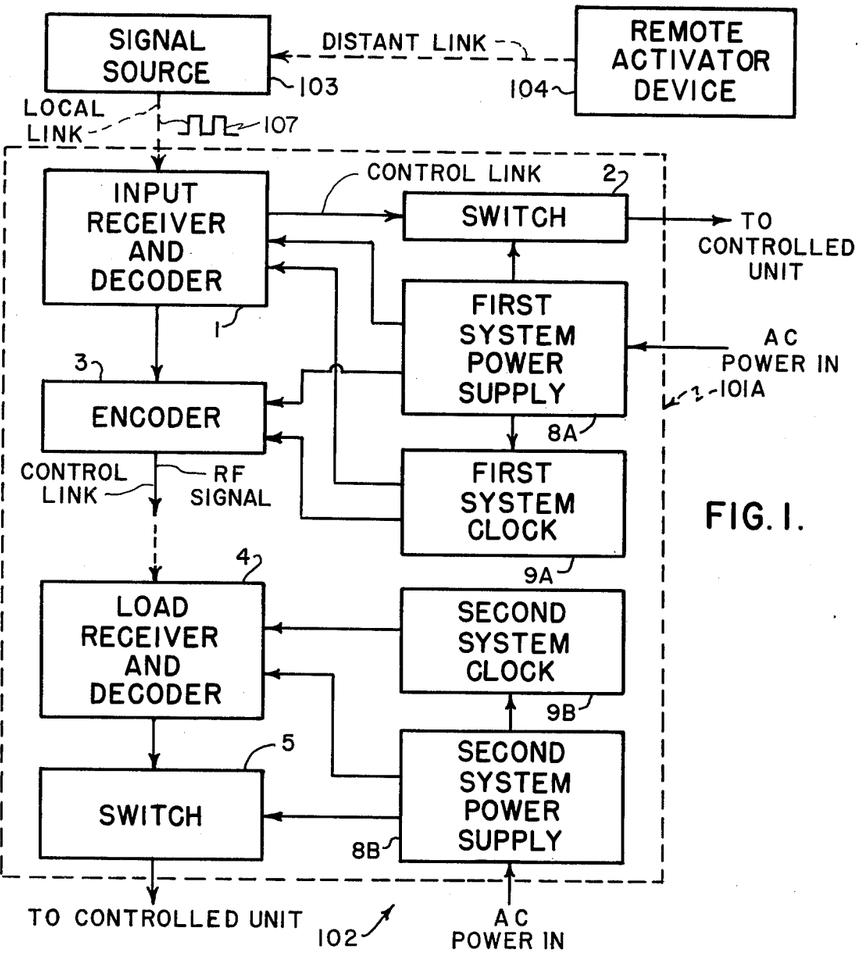
FIG. 1 is a block diagram representation of a system that embodies the present inventive concepts.

The system shown at 102 in FIG. 1 includes a signal source 103 (which may be a telephone i.e., the receiving telephone herein), a remote activator device 104 (which may be a telephone, i.e., the sending telephone herein) and an electronic actuator or remotely activated command and control device 101A of the present invention. The actuator 101A is placed close enough to the signal source 103 to receive across a local link, as shown, an electromagnetic (or other input) therefrom in the form of an input signal 107 and, upon receipt of an appropriate input signal, to perform switching, as now explained.

The actuator 101A is composed of an input receiver and decoder 1 that is located near enough to the signal source 103 to receive an electromagnetic or other signal as input thereto from the signal source. Typically, the input receiver and decoder 1 is placed in an enclosure that acts as a pedestal for the signal source 103. Anyway, on the basis of an appropriate set of signals, a switch 2 may be activated to control some unit which may be a light, an air compressor, an electric water heater, or the like. The switch may, of course, be hard wired to the input receiver and decoder 1, but in the preferred form of the invention it is not; that is, the switch 2 is intended to be in the same housing as the input receiver and decoder 1 but the switch labeled 5 (in FIG. 4B) and related elements (hereinafter referred to collectively as a remote load actuator) are in a separate housing and usually, in an operating system, installed some distance from the input receiver and decoder 1, as now explained.

As is explained hereinafter, the elements in the actuator 101A can be powered from a wall outlet (i.e., typically 120 volts ac); upon receiving an appropriate message, an encoder 3 produces a predetermined digital code which is applied to a low-power, RF carrier (e.g., 200 kHz) that is introduced to the ac wires powering the actuator and, thus, to the immediate or local power distribution system. The RF code is picked up by a load or second receiver and decoder 4 (of the remote load actuator) which may be placed some distance therefrom and at the location of the ultimate unit to be controlled by the switch 5. Thus, the switches 2 and 5, as above indicated, perform the same function, that of controlling a load, but the switch 2 is in the same enclosure as the input receiver and decoder 1 while the switch 5 is not; i.e., the switch 5 is located some distance from the unit 1. If the system is one employing only the switch 2, that is, without the remote load actuator, it need not be line powered, but may be battery powered, and, of course, the encoder 3 is not needed.

The first receiver and decoder 1, the switch 2 and the encoder 3 all include digital logic elements and these are timed by a first system clock 9A and all are powered by a first system power supply 8A; a second system clock 9B and a second system power supply 8B in the remote load actuator perform similar functions for the circuit elements 4 and 5. A preferred form of the switch 5 (or the switch 2) is shown in FIG. 4B comprising a timing unit 5B and a switching unit 5A that includes a switching thyristor TH2 and a relay comprising a coil $L_R$ and a switching mechanism S15, as later discussed. The circuit elements in the blocks 1, 3, 8A and 9A of FIG. 1 are shown in combined FIGS. 3A and 3B; the circuit elements 4, 5, 8B and 9B are shown in combined FIGS. 4A and 4B.

Figure 2:
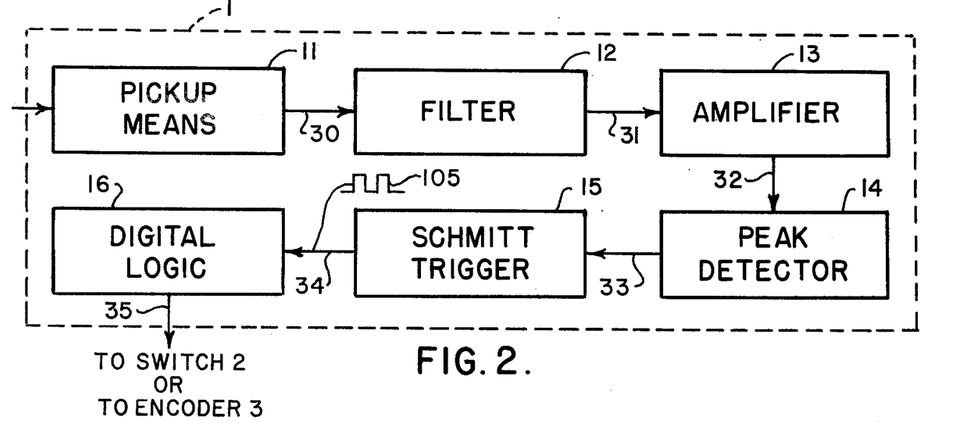
FIG. 2 is a block diagram representation of a portion of the system of FIG. 1.
Figure 3A:
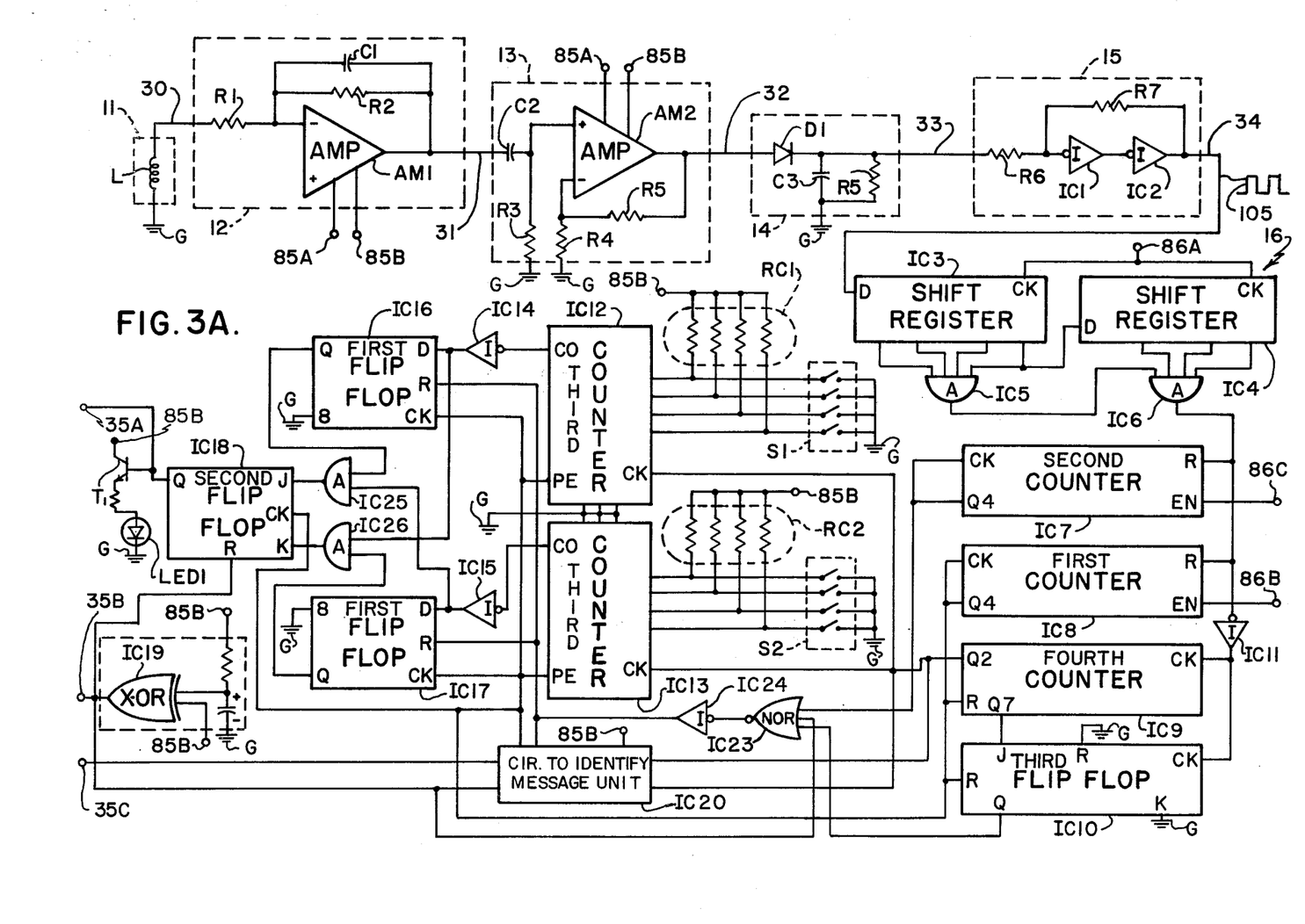
FIGS. 3A and 3B show, schematically, a portion of the system of FIG. 1.
Figure 3B:
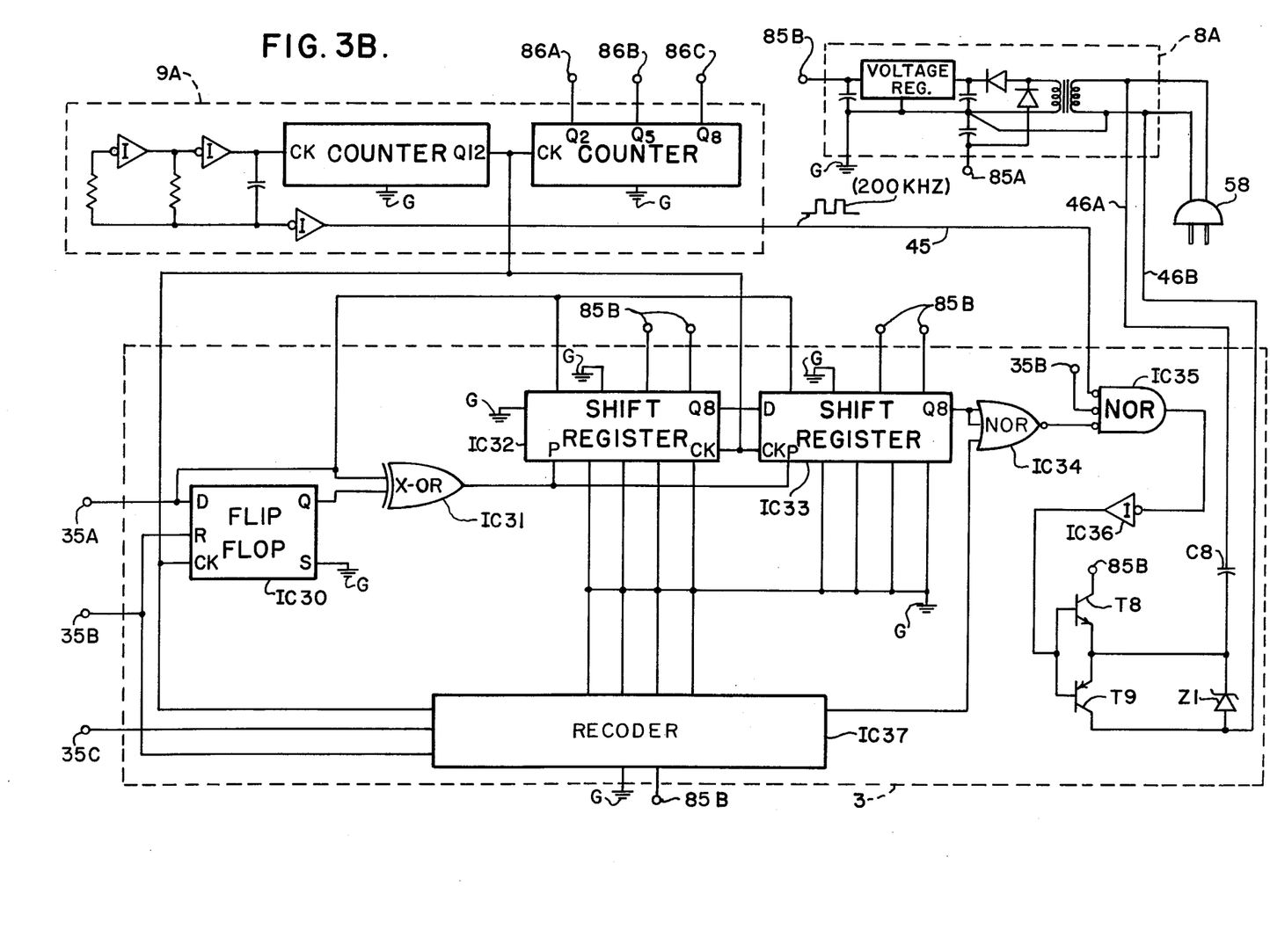

The receiver and decoder 1, as shown in FIG. 2, comprises pickup means 11 (which may be a microphone, pickup coil, piezoelectric acoustic pick device or the like, but which is shown as a pickup coil at L in FIG. 3A), a filter 12, an amplifier 13, a peak detector 14, a Schmitt trigger 15 and digital logic 16, all of which are discussed in some detail in the next few paragraphs with reference to FIGS. 3A and 3B. As above indicated, FIGS. 3A and 3B together constitute a detailed schematic of the elements 1, 3, 8A and 9A in FIG. 1: essentially, FIG. 3A contains the elements of the input receiver and decoder 1 and the other elements are in FIG. 3B; however, there is some overlap which will be pointed out. Also the connections or leads marked 30–35 in FIG. 2 appear again in FIGS. 3A and 3B except that the lead 35 is shown as multiple leads 35A, 35B and 35C.

The signal 107 from the signal source 103 in the preferred embodiment, and as above mentioned, is an electromagnetic input signal that is picked up by the sensing coil L located very near the signal source (i.e., often the signal source is a telephone, the coil L is generally located immediately beneath the telephone) and is converted by the coil L to an internal signal. The electromagnetic input is propagated by wireless (i.e., no hard wire connection) across the local link (here the local link is air) from the signal source 103 to the device 101A.

The filter 12 in FIG. 3A is an inverting connection, operational amplifier AM1 with a feedback capacitor C1 to form a single pole filter; it includes also resistors R1 and R2 to set the gain. The amplifier 13 is capacitively coupled through a capacitor C2 to the filter 12 and includes an operation amplifier AM2 and resistors R3 and R4 to provide additional signal amplification.

The peak detector 14 uses a diode D1, capacitor C3 and resistor R5 to detect the amplitude of the envelope of any incoming signal. The output of the peak detector 14 is connected to the Schmitt trigger 15 which consists of two cascaded inverters IC1 and IC2 and resistors R6 and R7 to give hysteresis. Ths Schmitt trigger 15 serves to digitize the output of the peak detector; that is an output from the peak detector above some threshold is interpreted by the Schmitt trigger to be a "1" or Hi and below that level to be "0" or Lo. The circuitry in FIG. 3A between the pickup coil L and the conductor 34 constitute analog circuitry that receives input signals and removes those signals that do not constitute proper pulses. The output of the analog circuitry at the conductor 34 is a pulse train 105; the remaining circuitry in FIG. 3A is digital circuitry which receives the pulse train 105 and determines whether it is one that should be taken seriously or one that should be ignored.

The function of the digital logic 16 is to analyze the output of the Schmitt trigger, which output may contain a code that is intended to produce some desired result, as later explained. More precisely, in order that the switch 2 or the switch 5 be activated, it is required that the input signal to the receiver and decoder 1 contain an appropriate and predetermined code. It is to the determination of whether or not such appropriate and predetermined code is contained in any incoming signal that the digital logic 16 is directed.

The digital logic 16 takes any pulse or pulses train output 105 from the Schmitt trigger 15 and performs a number of operations as to each individual pulse: first, it measures the width of the pulse to establish whether said pulse is within some preestablished minimum pulse width; and, second, it measures the time between pulses to establish whether an appropriate spacing of pulses is found in the incoming signal. The foregoing functions, as hereinafter discussed, act to establish that the incoming message is from an appropriate source e.g., if the pulse width of the pulse sensed is within tolerance, the system accepts it as appropriate); the function of analyzing pulse spacing is in connection with multiple signals to note whether such multiple signals arrive on some preestablished schedule.

The digital logic comprises shift registers IC3 and IC4 that receive the output of the Schmitt trigger 15 as input thereto and provide as output signals to AND gates IC5 and IC6. The shift registers receive, as further input, clock pulses from the first system clock 9A in FIG. 3B (the terminals labeled 86A, 86B and 86C in FIG. 3B indicate clock inputs from the clock 9A); in the event that a pulse input to the two shift registers has a certain minimum width, there is an output signal from the AND gate IC6 which serves as inputs to counters IC7, IC8 and IC9 and a third flip-flop IC10, the latter two being connected through an inverter IC11. The circuitry in FIG. 3A is quite explicit and self-explanatory, but a short explanation is in order. The first counter IC8 determines that a pulse train 105 has ceased; the second counter IC7 shows that a series of pulse trains has been received; the fourth counter IC9 and the flip-flop IC10 are used to indicate that more than a required number of pulses has occurred. The remaining circuitry in FIG. 3A between the elements IC7-IC10 and outputs 35A and 35C constitute two parallel circuits to permit identification of individual message units, that is, the block labeled IC20 contains elements identical to the upper elements between IC-7-IC10 and the output 35A; the upper group of circuit elements will identify say a 2-3 or 3-2 message unit (i.e., a two-ring telephone call followed by a three-ring telephone call or a three-ring telephone call followed by a two-ring telephone call, respectively) and the circuitry labeled IC20 will identify, say, a 3-4 and 4-3 message unit. (There can be N such circuits, like the circuit IC20, to identify N message units and to act thereupon.)

The counters marked IC12 and IC13 (and which together constitute a third counter means herein) serve to count the number of input pulses in any pulse train and to show that the number of pulses in an incoming message unit is an acceptable one. What is done here is to load a predetermined number or code in each counter and to countdown; a zero count in counter IC12 or IC13 and a simultaneous signal from the counter IC8 indicate receipt of a correct input signal. Said simultaneous signal from the counter IC8 is connected as clock input to flip-flops IC16 and IC17 (that together constitute the first flip-flop means herein) whose D inputs are connected through inverters IC14 and IC15, respectively, to the carry-out (CO in the drawing) outputs of the counters IC12 and IC13, respectively. The code (i.e., the input numbers) to the counters IC12 and IC13 is entered by way of manual switches S1 and S2, respectively, and changed by the same switch (by thumb switches or the like). Resistors RC1 and RC2 are pullup resistors used in conjunction with the switches S1 and S2 (e.g., thumb wheel switches) to set the code in the counters IC12 and IC13. The output from the first counter IC8 that clocks the flip-flops IC16 and IC17 also clocks a second flip-flop IC18 whose J and K inputs are respectively connected through AND gates IC25 and IC26 to the Q outputs of the flip-flops IC16 and IC17, respectively, and the outputs of the inverters IC15 and IC14, respectively. If either the counter IC12 or the counter IC13 has counted to exactly zero during the pulse train, that indicates receipt of a correct number of proper pulses and that information is stored in the one of the flip-flops IC16 or IC17 that corresponds to the counter IC12 or the counter IC13. The circuitry in FIG. 3A is adapted to handle two inputs (e.g., a 2-3 code wherein a 2-3 turns the switch (i.e., the switch 2 or the switch 5) ON and a 3-2 message turns the switch (i.e., the switch 2 or the switch 5) OFF; the input could be 2-4 or 3-5, or 4-5, etc., up to fifteen). A 2-2 or 4-4, or 5-5, etc., message unit, will cause the output to toggle.

The function of the circuitry just described is to detect the coincidence of the end of a chain of pulses (i.e., an output from the counter IC8) and a signal from the flip-flop IC16 or the flip-flop IC17, combined, respectively, with an inverted output from the counter IC12 or the counter IC13: when such coincidence occurs the flip-flop IC18 is set or reset. An output from the flip-flop IC16 and an inverted output from the counter IC13 sets the flip-flop IC18; an output from the flip-flop IC17 and an inverted output from the counter IC12 resets the flip-flop IC18. When the flip-flop IC18 is set, its Q output goes from Lo to Hi; on reset the Q output goes from Hi to Lo. The Q output of the flip-flop IC18 is the output 35A which is connected as input to the circuitry of FIG. 3B and which turns on a transistor $T_1$ and, hence, a light emitting diode $LED_1$ that indicates in the system the receipt of a complete and proper message unit (e.g., a 2-3 ring or a 3-2 ring); a Hi on the Q output can be employed to actuate the switch 2 or perform some other function, as well. The R output of the flip-flop IC18 is connected together with the R output of a similar flip-flop in the parallel circuit IC20 to the output (i.e., the lead 35B) of an EXCLUSIVE OR gate IC19. The input to the EXCLUSIVE OR gate IC19 is connected to a standard RC circuit used to generate a pulse when the activator 101A is first turned ON or energized; the pulse thus generated serves to reset the flip-flop IC18 and, through a NOR gate IC23 and INVERTER IC24, also resets flip-flops IC16 and IC17. The output 35C, of course, is the Q output of a flip-flop (like the flip-flop IC18) in the parallel circuit IC20.

The function of the circuitry in FIG. 3B is to place a high frequency (e.g., 200 kHz) signal in the form of bursts or pulses as an input into the power wiring of a building or the like through a wall plug 58 that powers the system of FIGS. 3A and 3B, along the lines labeled 46A and 46B in FIG. 3B. The high frequency signal, as shown, is a series of pulses from the clock 9A along a conductor 45 that serves as one input to a NOR gate IC35 that is part of the encoder 3 and that has another input along the conductor 35B and a further input from a NOR gate IC34 whose inputs come from the further logic circuitry in the encoder 3. The encoder 3, like the input receiver and decoder 1, has a parallel circuit labeled IC37 which has the same circuit elements as those labeled IC30-IC33 in FIG. 3B. Functionally, these elements take inputs at 35A, 35B and 35C and effect appropriate switching of the NOR gate IC35, as now explained.

Figure 4A:
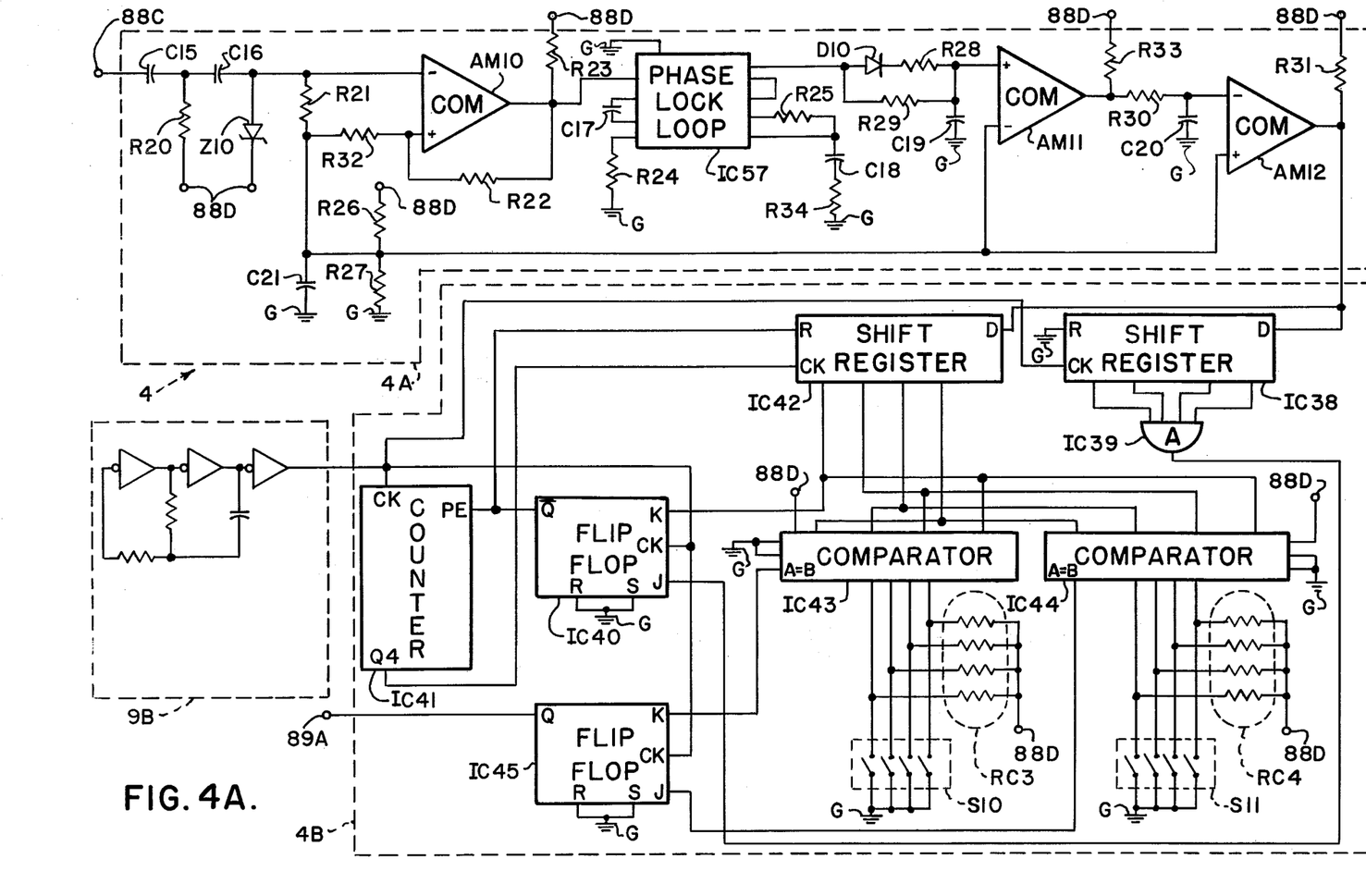
FIGS. 4A and 4B show, schematically, a portion of the system of FIG. 1 and FIG. 4B includes a load that is selectively activated and deactivated by the system.
Figure 4B:
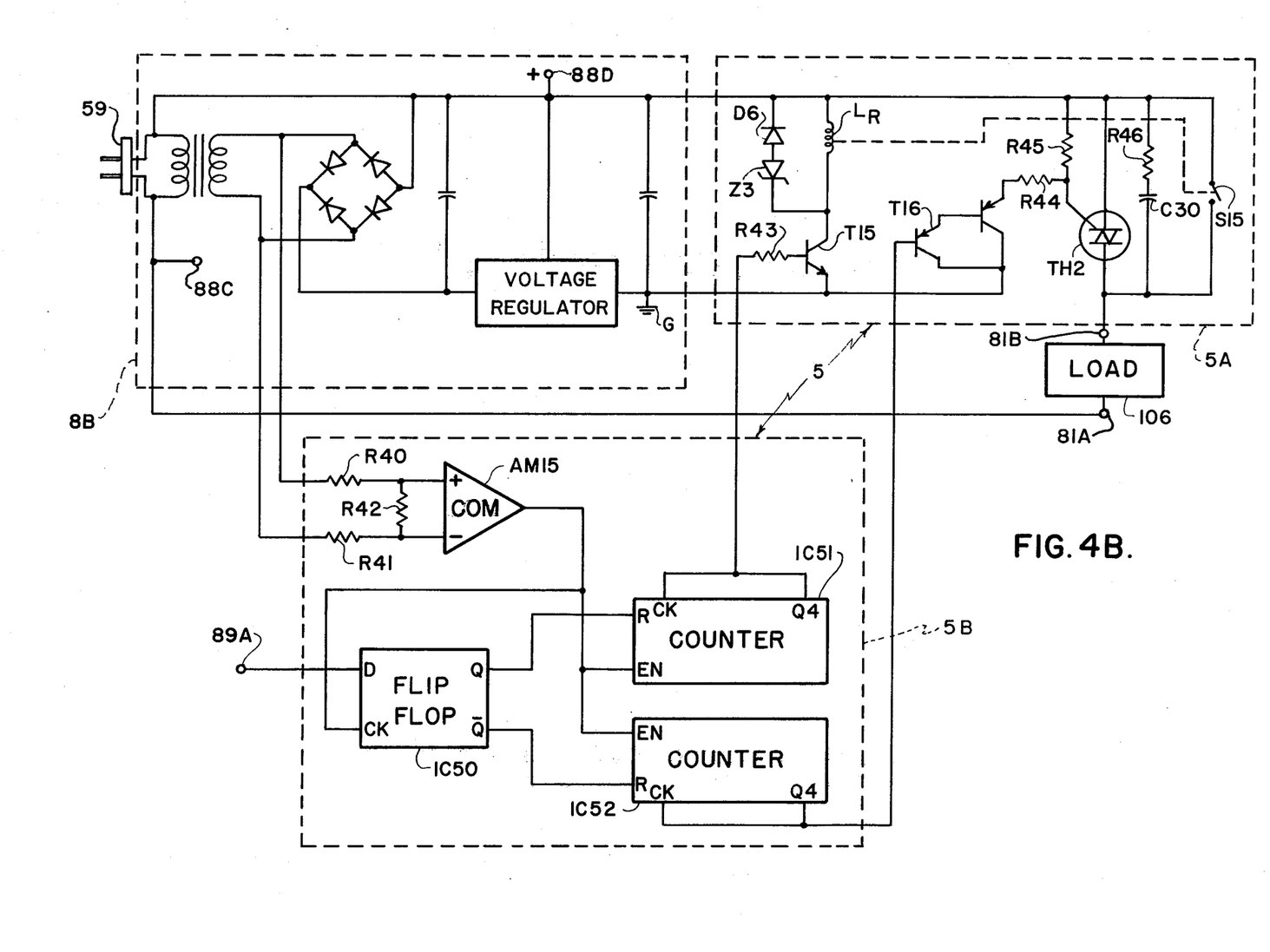

When the flip-flop IC18 in FIG. 3A is set, that is, provides a Hi output at the conductor 35A, the flip-flop labeled IC30 in FIG. 3B is set one clock pulse later; an EXCLUSIVE OR gate IC31 has one input from the conductor 35A and another from the Q output of the flip-flop IC30 and provides an output when these two inputs are not equal. The output of the EXCLUSIVE OR gate IC31 provides a parallel set pulse to shift registers IC32 and IC33. The information that is parallel loaded into the shift registers IC32 and IC33 contains identical information which is thusly shifted twice to assure its integrity. The NOR gate IC35 in the arrangement shown conducts when it receives a "1" from the NOR gate IC34; hence, the high frequency pulses along the conductor 45 pass through the NOR gate IC35 at this juncture. The high frequency pulses are inverted by an inverter IC36, amplified by transistors $T_8$ and $T_2$ (protected by a zener diode Z1), and coupled to a capacitor C8 to the leads to the the wall plug 58 and the distribution wiring and thence to the circuitry of FIGS. 4A and 4B. The net result of the circuitry shown in FIG. 3B is that it sends out an RF pulse train every time the flip-flop IC18 in FIG. 3A is set or reset, that is, every time a new proper message is received from the signal source 103 in FIG. 1. The message thus applied to the distribution system, then, is also a pulse train, but one made up of high frequency RF bursts, that is carried by the wires; it is coded; and it is sensed by the circuitry of FIGS. 4A and 4B and acted upon. In the system herein disclosed, as above indicated, there can be N message units to control N pieces of electrical apparatus at N different and widely spaced locations; although one remote load actuator or load control receiver unit is shown schematically in FIGS. 4A and 4B there can be N such devices, each adapted to receive and act upon a particular coded signal comprising said RF bursts. FIGS. 4A and 4B, as previously noted, show schematically the block elements 4, 5, 8B and 9B (which in combination constitute a remote load actuator or load control device) as well as a block 106 labeled "load". The circuitry that forms the second system clock 9B is marked such and should require no further explanation here; a similar remark applies to the second system power supply 8B, it being merely noted that points or leads 88C and 88D in FIG. 4B are found also in FIG. 4A.

The load control device of FIGS. 4A and 4B receives a message unit composed of RF bursts from the incoming power line through the wall plug shown at 59 in FIG. 4B; the message unit in the preferred form is a binary code. It is the function of each load control device to identify its appropriate binary code and act. On the basis of the above discussion, it will be readily appreciated that there may be N load control devices as shown in FIGS. 4A and 4B, each adapted to sense one binary code; each may be at a location separated from the other; and each is contained in a very small package that can be plugged into a wall outlet, the plug 59 serving as a physical support for the package as well as a power connection for 60 Hz power and a signal connection for the 200 kHz signal. Also, the digital code number to any particular load control device need not, and usually will not, be the same code as that which activated the particular associated sensing circuit (e.g., the sensing circuit IC20) in the apparatus of FIG. 3B. Hence, one sensing device (i.e., a device having the combined circuitry of FIGS. 3A and 3B) can control a plurality of the load control devices of FIGS. 4A and 4B.

In FIG. 4A the load receiver and decoder 4 is shown consisting of a receiver portion 4A and a decoder portion 4B. The point 88C is the input to the receiver portion 4A and is capacitively coupled to the incoming power line through a capacitor C15. The capacitor C15, a capacitor C16 and resistors R20 and R21 form a Hi-pass filter that serves to filter out the 60 Hz energy at the point 88C and pass the RF bursts (at 200 kHz) to the receiver portion 4A. A zener diode Z10 is used to protect the input of a comparator AM10. The RF bursts are received by the comparator AM10 connected with resistors R 22 and R 32 to give hysteresis and arranged to look at zero crossings of the high frequency RF bursts at the output of the Hi-pass filter. The output of the comparator AM10 is a square wave (i.e., a "1") at the high frequency (i.e., 200 kHz here) that is Hi when the input is Hi and Lo when the input is Lo. A phase lock loop IC57 is connected to receive the output of the comparator AM10 and is adjusted to lock on a signal around the high frequency (i.e., 200 kHz here). A lock detector, comprising a diode D10, resistors R28-R31 and R33, comparators AM11 and AM12 and capacitors C19 and C20, indicate whether or not the phase locked loop IC57 is locked and, hence, whether or not a high frequency input of appropriate frequency is present. The receiver portion 4A further includes capacitors C17, C18, and C21 and resistors R22-R27, R32 and R34. The output, of the receiver portion 4A is connected as input to the decoder portion 4B, as shown.

The input to the decoder portion 4B is connected to the D input of a shift register IC38 whose outputs are connected as inputs to an AND gate IC39 to provide an output when all four outputs of the shift register IC38 are Hi. The output of the AND gate IC39 is connected to the J input of a flip-flop IC40 to set the flip-flop when the output of the AND gate IC39 is Hi. When the flip-flop IC40 is set it starts counter IC41 to commence clocking information into a shift register IC42 so that the shift register IC42 will contain, eventually, the same information as is present in the shift registers IC32 and IC33 (or similar shift registers in the circuitry IC37, depending upon the code on the input to the system 101A). Digital comparators IC43 and IC44 have as one set of inputs to each a code set on the basis of switches S10 and S11, respectively, and associated resistor banks RC3 and RC4, respectively. The switches S10 and S11 may be thumb wheel switches, as before, and the switching code determines whether the circuitry in FIG. 4A will take note of the message in the shift register IC33 of FIG. 3B or a similar shift register in the circuitry IC37 or in any one of a plurality of shift registers in further circuitry like that in IC37. Thus, as above indicated, a plurality of elements like that shown at 4 in FIG. 4A can be employed at diverse locations, each such element being tuned by appropriate setting of switches, like the switches S10 and S11, to an appropriate digital code. Execution is effected by a flip-flop IC45, whose J and K inputs come from the comparators IC44 and IC43, respectively, to provide an output at 89A to the circuitry of FIG. 4B.

In FIG. 4B, the switch 5 is shown comprising a timer or timing portion 5B and a switching portion 5A. The load 106 is fed through the thyristor TH2 and the relay contacts or solid state contact switching mechanism S15. The action in the switch 5 is this: to introduce electric current thereto, the load 106 is connected across the incoming power conductors from the wall plug 59 or the like first through the thyristor TH2 (here a triac); then the switch mechanism S15 is closed, by-passing the thyristor TH2 with a zero resistance drop; said another way, the thyristor TH2 is gated ON first and, after a small time delay (i.e., one second) the contacts S15 are closed. When opening the line to the load 106, the thyristor remains gated ON, the mechanical contacts S15 are opened and, then, after a time delay, the thyristor TH2 is gated OFF; the thyristor TH2 will cease to conduct when a reverse bias is automatically applied thereto by the ac load current. In the arrangement shown, current to the load 106 passes through the plug 59; in practical apparatus, connection to the load 106 can can be made by having a female outlet and plug arrangement (at points 81A and 81B in FIG. 4B) to permit manual connect and disconnect of the load 106.

Timing to effect the foregoing is accomplished by the timer or timing unit 5B. An amplifier AM15 in the timer generates a line frequency clock signal from the 60 Hz power through the resistors R40-R42, and that clock signal is applied as input to counters IC51 and IC52. The timer 5B further includes a flip-flop IC50 that sets counters IC51 and IC52 that supply base current to transistors T15 and T16, respectively. The transistor T15 controls current through the holding coil $L_R$ of the switch mechanism S15 and, thus, the state of the mechanism; the transistor T16 acts to gate the thyristor TH2. The switching portion 5A further includes resistors R43-R46, a diode D6 and a zener diode Z3. Since the timing unit 5B is clocked at the 60 Hz input of the incoming ac power line and is thus synchronous therewith, it is possible, in the arrangement shown, always to gate the thyristor TH2 ON at a zero crossing of the ac line. In this way switching transients and RF noise are minimized. The switch 5 just described permits activation and deactivation of substantial electrical loads without pitting of the contacts S15 and continuous energization of the load without the usual load loss occasioned by a series thyristor. Since, as above noted, the package consisting of the elements 4, 5, 8B and 9B in FIGS. 4A and 4B is a small wall unit that plugs into a wall outlet in a house, for example, and since the load 106 can be substantial one, elimination of thyristor loss is an important facet since it removes the need for a big heat sink or the like.

A few matters which may be fully explained previously are taken up here. A common connection or actual earthing is designated G in FIGS. 3A, 3B, 4A and 4B; it will be appreciated that, since the sensing system of FIGS. 3A and 3B is in one housing at one location and the remote load actuator system of FIGS. 4A and 4B is in another housing at another location remote from the first, G can be a common point to both systems only if it is actual earthing (but G need not be a common point in both systems). In FIGS. 3A and 3B, points or leads marked 86A, 86B and 86C are three outputs from a counter in the first system clock 9A in FIG. 3A and these appear as inputs in FIG. 3B. The points or leads designated 85A and 85B are respectively a negative power supply (e.g., −10 volts) a positive power supply (e.g., +10 volts). The point or lead designated 88C in FIG. 4B is connected to one conductor of the plug 59 to receive the 200 kHz bursts and in FIG. 4A to introduce those bursts to the coupling capacitor C15; the point or lead 88D in FIGS. 4A and 4B designates a positive power supply (e.g., +10 volts).

Further modifications of the invention herein disclosed will occur to persons skilled in the art and all such modifications are deemed to be within the spirit and scope of the invention as defined by the appended claims.

What is claimed is:

1. A remotely activated command and control device that comprises, in combination: transducer means operable to pickup as input thereto across a local link a wireless input signal, initiated over a distant link, in the form of a predetermined code and to convert the same to an internal signal; means for decoding connected to accept the internal signal from the transducer means and to provide an activating signal that is directly related to the code on the input signal, said means for decoding comprising analog means and digital logic means; and switch means that receives the activating signal and is selectively activated thereby, the switch means comprising a set of mechanical contacts in parallel with a thyristor to bypass the thysistor, when closed, with a lowresistance bypass, and timer means operable to control the thyristor and the mechanical switching contacts to render the switch means respectively conductive and non-conductive, as follows: the closing of the mechanical contacts is timed by the timer means such the thyristor is caused to conduct prior to closing the mechanical contacts and then the mechanical contacts are closed, and the switch means is rendered non-conductive by first opening the mechanical contacts and then rendering the thyristor non-conductive.

2. A remotely activated command and control device as claimed in claim 1 that further includes signal source means to provide the input signal, the local link between the signal source means and the transducer means being air, the transducer means comprising a microphone, the input signal being a train of acoustic pulses of predetermined length from the signal source means to the microphone.

3. A remotely activated command and control device as claimed in claim 1 that further includes signal source means to provide the input signal in the form of a electromagnetic signal, the transducer means being an inductive pickup that is located sufficiently close to the signal source means to pick up the electromagnetic signal.

4. A remotely activated command and control device as claimed in claim 3 wherein said input signal is in the form of a plurality of pulse trains comprising pulses of predetermined minimum width and predetermined maximum width.

5. A remotely activated command and control device as claimed in claim 1 that further includes signal source means to provide the input signal and in which the local link is a mechanical link that transfers the input signal as a mechanical vibrational signal from the signal source means to the transducer means.

6. A device as claimed in claim 1 wherein the input signal is in the form of a plurality of signal pulses of predetermined width and spacing between pulses and wherein the means for decoding is operable to sense whether a signal contains pulses of said predetermined width and spacing within an acceptable tolerance.

7. A device as claimed in claim 6 wherein the predetermined code comprises at least one set of said signal pulses, each set comprising a plurality of said signal pulses.

8. A device as claimed in claim 7 wherein the input signal is an acoustic signal, said system including a narrow-band input filter to isolate the signal of interest.

9. A device as claimed in claim 7 wherein the analog means comprises amplifier means; a peak detector, and a Schmitt trigger, the output of the Schmitt trigger being in the form of Schmitt-trigger pulses that supply input to the digital logic means.

10. A device as claimed in claim 9 wherein the digital logic means comprises a shift register, an AND gate and a clock, one input to the shift register being connected to the Schmitt trigger to receive the Schmitt trigger pulses and the other input of the shift register being from the clock to receive clock pulses, the shift register and the AND gate interacting to determine whether the Schmitt trigger pulses are greater than a prescribed minimum width.

11. A device as claimed in claim 10 in which first counter means is connected to receive as one input thereto the output of the AND gate and as another input thereto clock pulses at one predetermined frequency, said first counter means serving to determine when one set of said signal pulses has ceased.

12. A device as claimed in claim 11 that includes second counter means connected to receive as one input thereto the output of the AND gate and as another input thereto clock pulses at a frequency less than about half said predetermined frequency, said second counter means serving to determine the end of the plurality of sets.

13. A device as claimed in claim 12 that includes third counter means and fourth counter means, said fourth counter means having a clock input connected to the output of the AND gate and serving to provide one output pulse for every two pulses on the output of the AND gate.

14. A device as claimed in claim 13 wherein the clock input of the third counter means is connected to the output of the fourth counter means, the third counter means having a preset number therein and being adapted to count down toward zero during a signal transition at the output of the fourth counter means, the third counter means having an output therefrom at zero count therein.

15. A device as claimed in claim 14 wherein said predetermined code comprises a plurality of sets and in which said third counter means comprises an equal number of counters to the number of sets.

16. A device as claimed in claim 15 having first flip-flop means to provide an output when one appropriate or proper set of pulses has been received by the system, there being one flip-flop for each counter in the third counter means, each of which is connected to receive an input from one of the counters of the third counter means and another input from the output of the first counter means.

17. A device as claimed in claim 16 having second flip-flop means to provide an output when both said one appropriate or proper set has been received and when another appropriate or proper set has been received, the second flip-flop means comprising half the number of flip-flops of the first flip-flop means and being connected to receive as input the output of the first flip-flop means and the output of the third counter means, the output of the second flip-flop means being the output of the means for decoding.

18. A device as claimed in claim 17 having reset means to reset the third counter means and the first flip-flop means, the reset means being activated by the output of the second counter means.

19. A device as claimed in claim 18 having third flip-flop means connected to sense a number of pulses greater than a predetermined and proper number of pulses and connected to activate the reset upon the occurrence of an excessive number of pulses.

20. A device as claimed in claim 19 that includes a low voltage sensor that acts to reset the system at turn-on.

21. A device as claimed in claim 1 that includes coding means connected to receive a signal from the digital logic means and operable to convert the same to a coded high frequency signal.

22. A device as claimed in claim 21 wherein the coding means includes means to couple the high frequency signal into a distribution power line.

23. A system as claimed in claim 22 that includes means to effect amplitude modulation of the high frequency signal.

24. A system as claimed in claim 22 wherein the coding means includes digital logic that serves to effect transmission of the coded high frequency signal a plurality of times into the distribution power lines.

25. A device as claimed in claim 24 wherein the means for decoding and the switch means are components of a load control device operable to sense said high frequency signal and to be selectively activated thereby.

26. A device as claimed in claim 25 that further includes clock means synchronized to the ac line that powers the system, the timer means being operable to gate the thyristor off and to open said mechanical contacts in a sequence that causes the thyristor to be rendered non-conductive a zero crossing of the ac line voltage.

27. A system as claimed in claim 21 that includes load receiver and decoder means that receives the transmitted high frequency signal and decodes the same.

28. A system as claimed in claim 27 wherein the coded high frequency signal is transmitted along a distribution power line and wherein the receiver and decoder means includes a phase locked loop capacitively coupled to said distribution power line and adapted to lock to said high frequency signal, said receiver and decoder means being operable to suppress any 60 Hz or other low frequency energy on the distribution power line.

29. A system as claimed in claim 28 wherein the receiver and decoder means contains means to detect the condition of lock of the phase locked loop to the high frequency signal and provide an indication of lock.

30. A system as claimed in claim 29 wherein the receiver and decoder means contains digital logic circuitry means that serves to decode the high frequency signal by comparing the same with an internal preselected reference or standard and to activate the switch means in the event that the input high frequency signal is an acceptable one.

31. A system that includes a device as claimed in claim 1 and that further includes a signal source to generate the input signal, the signal source being separated from the transducer means but coupled thereto by said local link.

32. A system as claimed in claim 31 that further includes a remote activator device separated from said signal source but coupled thereto by said distant link, the remote activator device being adapted to receive an input thereto and to activate the signal source across said distant link in response to the input.

33. A system as claimed in claim 32 wherein both the signal source and the remote activator device are telephones.

34. For use in association with a telephone system that includes a sending telephone and a receiving telephone, a remotely activated control device that comprises, in combination: pickup means to receive an input signal from the receiving telephone, initiated over a distant link from the sending telephone, in the form of a predetermined code, the pickup means serving to convert the input signal to an internal signal, there being no hard-wire electrical connection between the receiving telephone and the pickup means; means for decoding connected to accept the internal signal from the pickup means and to provide an activating signal that is the one commanded by the code of the input signal, said means for decoding comprising analog means and digital logic means; and switch means that receives the activating signal and is selectively activated thereby, said switch means comprising a thyristor, a set of mechanical contacts in parallel with the thyristor to bypass the thyristor, when closed, with a low-resistance by-pass, and timer means operable to control the thyristor and the mechanical switching contacts to render the switch means respectively conductive and non-conductive, as follows: the closing of the mechanical contacts is timed by the timer means such that the thyristor is caused to conduct prior to closing the mechanical contacts and then the mechanical contacts are closed, and the switch means is rendered non-conductive by first opening the mechanical contacts and then rendering the thyristor non-conductive.

35. For use in a system wherein digital messages are transmitted along electrical distribution wriring, a remote load actuator operable to sense the messages, to be selectively activated thereby, and to control a load on the basis of the messages, said remote load actuator comprising an electronic switch to activate and deactivate said load, said electronic switch comprising, in combination, a thyristor, mechanical contact means having a pair of mechanical contacts connected to effect electrical current bypass of the thyristor when the contacts are closed, and timer means connected to gate the thyristor and connected, as well, to control the state of the mechanical contact means, the closing of the mechanical contacts being timed by the timer means such that the thyristor is caused to conduct prior to closing the mechanical contacts and then the mechanical contacts are closed thus rendering the switch means conductive, the switch means being rendered nonconductive under the control of the timer means by first opening the mechanical contacts and then rendering the thyristor nonconductive.

36. A remotely activated command and control device that comprises, in combination: transducer means to sense an incoming coded message transmitted to the transducer means by way of a wireless local link, which coded message originated at a location remote from the device and was transmitted by way of a distant link, said transducer means being operable to connect the coded message, thus received, to an electric signal that can be interpreted by logic elements in the device; means for decoding connected to receive the electric signal from the transducer means and to provide an electrical activating signal; and electric switch means that receives the electrical activating signal and is selectively activated thereby, the switch means comprising a set of mechanical contacts in parallel with a thyristor to bypass the thyristor, when closed, with a low-resistance bypass, and timer means operable to control the thyristor and the mechanical switching contacts to render the switch means respectively conductive and non-conductive, as follows: the closing of the mechanical contacts is timed by the timer means such that the thyristor is caused to conduct prior to closing the mechanical contacts and then the mechanical contacts are closed, and the switch means is rendered non-conductive by first opening the mechanical contacts and then rendering the thyristor non-conductive.

* * * * *